Aug. 8, 1944.  H. S. JONES  2,355,537
MEASURING AND CONTROL APPARATUS
Filed Nov. 19, 1942   2 Sheets-Sheet 1

INVENTOR.
HARRY S. JONES
BY
*E. B. Spangenberg*
ATTORNEY.

Aug. 8, 1944.     H. S. JONES     2,355,537
MEASURING AND CONTROL APPARATUS
Filed Nov. 19, 1942     2 Sheets-Sheet 2

INVENTOR.
HARRY S. JONES
ATTORNEY.

Patented Aug. 8, 1944

2,355,537

UNITED STATES PATENT OFFICE 2,355,537

MEASURING AND CONTROL APPARATUS

Harry S. Jones, Washington, D. C., assignor to The Brown Instrument Company, Philadelphia, Pa., a corporation of Pennsylvania Application November 19, 1942, Serial No. 466,130

28 Claims. (Cl. 171—95)

The present invention relates to the measurement of minute electrical currents or potentials and their utilization for control purposes and has particular utility in connection with the accurate measurement of electromotive forces having very low frequency components. Such electromotive forces, by way of example, may comprise the gradual and slow fluctuations in electromotive forces produced by a thermocouple and have been exceedingly difficult of direct amplification by the prior art arrangements.

An object of the invention is to provide a rugged and highly accurate instrument for indicating and/or recording minute unidirectional current or potential variations having low frequency components and/or for utilizing such currents or potentials for control purposes.

Another object of the invention is to provide an improved construction and arrangement of parts whereby minute unidirectional currents flowing in low resistance circuits may be accurately measured.

Another object of the invention is to provide an improved method of eliminating the effects of stray electrical fields or spurious electrical effects upon the operation of apparatus designed for measuring the magnitude and the changes in magnitude of minute electrical currents or potentials.

A further object of the invention is to provide an improved method of eliminating the effects of extraneously induced fluctuating or alternating currents upon the operation of measuring apparatus designed for making accurate measurements of minute unidirectional currents or potentials.

One of the most serious problems in the measurement of low frequency minute unidirectional potential or current variations in low resistance circuits is the difficulty of electrically amplifying such current variations. The direct amplification of such unidirectional potential or current variations by means of ordinary electronic amplifying systems is exceedingly difficult because of the fact that changes in the spacing and position of the electrodes of electronic amplifying tubes produce effects which are similar to and are of the same order of magnitude as the changes in the minute unidirectional potential or current variations to be measured.

It has been proposed in the prior art to amplify such minute potential or current variations in low resistance circuits by periodically interrupting the low resistance circuit and utilizing the resulting pulsating potential or current to produce an alternating current of one phase or of opposite phase depending upon the polarity of the unidirectional potential or current under measurement. In addition it has been proposed to periodically interrupt said low resistance circuit at the frequency of a given source of alternating current, to impress the resultant current or its alternating current component on the input circuit of an electronic amplifier, and to apply the output current of the amplifier to a reversible electrical motor to thereby selectively energize the motor for rotation in one direction or the other in accordance with the polarity of the unidirectional potential or current under measurement. In such prior art arrangements the motor controls the operation of various devices such, for example, as a potentiometer recorder. When the minute unidirectional potential to be measured is that produced by a thermocouple which is subjected to the temperature within a furnace, the motor may also be employed to control the operation of a valve for controlling the fuel supply, draft, or other agent for establishing the desired temperature condition within the furnace.

In such prior art arrangements for measuring the magnitude of minute unidirectional potential or current variations in low resistance circuits, a serious objection encountered has been the introduction of error into the measurement obtained due to extraneous fluctuating or alternating currents induced in the low resistance circuit from stray electrical or magnetic fields, or due to the introduction of other spurious electrical effects into the low resistance circuit.

Accordingly, it is a primary object of the present invention to provide in such measuring apparatus a novel construction and arrangement of parts whereby the effects of such extraneously induced fluctuating or alternating currents or other spurious electrical effects may be substantially eliminated.

A more specific object of the invention is to provide in such measuring apparatus an arrangement including a suitable circuit interrupting device for translating the minute unidirectional potentials or currents in the low resistance circuit into an alternating current which may be readily amplified and in which the frequency of operation of the circuit interrupting device is not critical and need not remain constant.

Another specific object of the invention is to provide in such measuring apparatus an arrangement for translating minute unidirectional potential or current variations into alternating currents which may be readily amplified in which the use of iron core transformers is not required and air core transformers may be utilized instead to the end that the induction of extraneous fluctuating or alternating currents into the measuring circuit from stray electrical or magnetic fields is reduced to a minimum.

A still further specific object of the invention is to provide in such measuring apparatus an arrangement for translating the minute unidirectional potential or current variations in low resistance circuits into an alternating current which may be readily amplified in which the frequency of operation of the circuit interrupting device is a relatively high frequency compared to the frequency of ordinary commercial alternating current supply sources, and the derived high frequency alternating current is employed to control the actuation of motive structure whereby the effects of extraneously induced alternating currents of commercial or other relatively low frequencies into the circuit are rendered incapable of affecting the operation of the apparatus.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 3 shows curves explaining the operation of the conversion circuit of Fig. 1.

Figure 1:
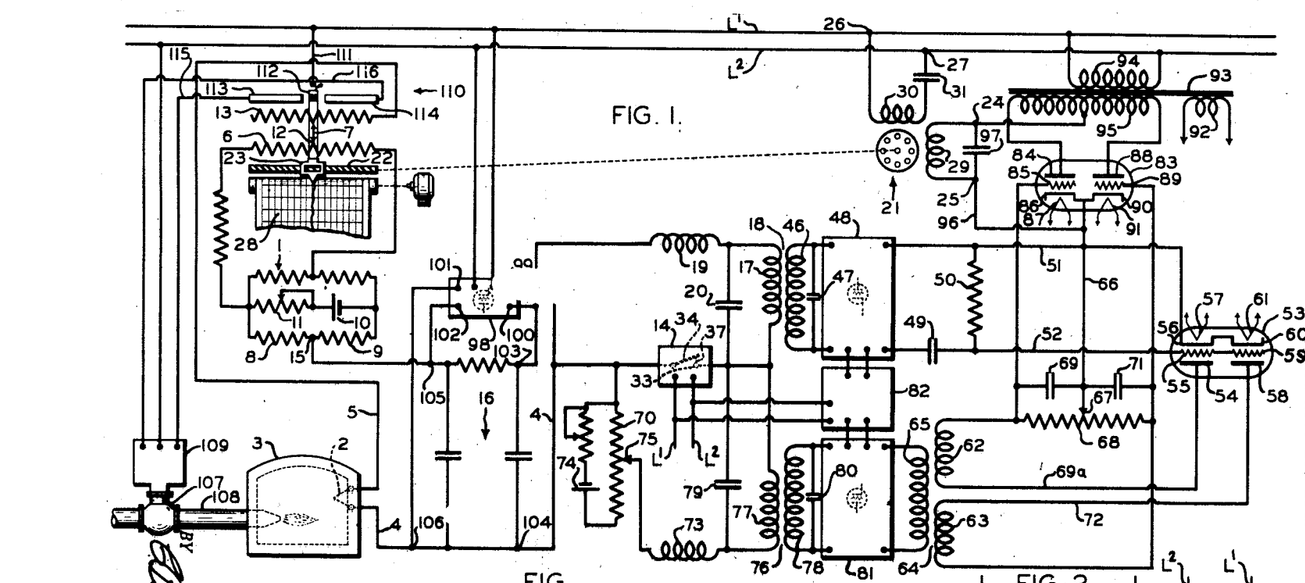
Fig. 1 is a diagrammatic representation of the use of the invention in a self balancing potentiometric recording system.

In Fig. 1 of the drawings there is illustrated in schematic form an arrangement including electronic amplifying means for producing effects in accordance with the extent of unbalance of a potentiometric network 1 which controls the electronic amplifying means and is unbalanced in accordance with the variations in a minute unidirectional electromotive force to be measured, namely, that produced by thermocouple 2, and in which because of the small magnitude of the electromotive force under measurement it is not practicable nor desirable to have the said effects produced directly by said electromotive force.

Specifically, an arrangement is illustrated in Fig. 1 of the drawings for recording the temperature of a furnace 3 in the interior of which thermocouple 2 which is responsive to slight changes in temperature to which it is subjected is inserted. The thermocouple 2 and the furnace 3 may be located at a distance from the remainder of the apparatus and the thermocouple 2 has its terminals connected by a pair of conductors 4 and 5 to the terminals of the potentiometric measuring network 1. The potentiometric measuring network 1 includes a main slidewire resistance 6 and an associated contact 7 which is capable of being moved along the length of the slidewire 6, and may be of any suitable type, for example, such as the Brown potentiometric measuring network disclosed in the Harrison et al. Patent 2,150,502 issued March 14, 1939.

More particularly, the potentiometric measuring network 1 is of the split potentiometer type and comprises three branches connected in parallel, one branch including the main slidewire resistor 6, a second branch including balancing resistances 8 and 9, and the third branch including a battery 10 or other source of current and a resistance 11 which may be adjusted as required to insure a current flow of the desired magnitude through the resistance 6. The sliding contact 7 engages the main slidewire 6 at the point 12 the position of which along the length of the resistor 6 is varied by the sliding adjustment of the contact 7. The contact 7 as shown is a bridging contact connecting the point 12 of the resistor 6 to a corresponding point of a slidewire resistance 13 which is positioned alongside the resistor 6.

The resistor 13 has one end connected by the conductor 5 to one terminal of the thermocouple 2 and is employed for the purpose of avoiding measurement inaccuracies due to variations in resistance to the flow of current generated by the thermocouple 3 which would otherwise result from variations in the relative resistances of the portions of the resistor 6 at the opposite sides of the point 12. The second terminal of the thermocouple 2 is connected by means of the conductor 4 to one terminal of a circuit interrupting device 14 which is illustrated in detail in Fig. 2 and is described in detail hereinafter. The other terminal of the device 14 is connected to the branch of the potentiometric measuring network 1 including the resistances 8 and 9 at the point 15 in said branch intermediate said resistances through a circuit including the primary winding 17 of an air core transformer 18, an inductance 19 and a filter 16, all of which elements are inserted in the conductor 4. Filter 16 is provided to prevent stray alternating currents which may be introduced into the potentiometric network 1 from flowing through the circuit branch including device 14, transformer primary winding 17 and inductance 19 and produces this desired result by providing a path between the potentiometric network point 15 and the thermocouple lead 4 which presents low impedance to such stray alternating currents but presents high impedance to the unbalanced potentiometric current flows and thus diverts the stray alternating currents from that circuit branch. A condenser 20 is connected in shunt to the primary winding 17. The constants of the transformer primary winding 17 and condenser 20 are so chosen, as is explained more in detail hereafter, that when a unidirectional potential is periodically impressed on the parallel connected circuit including primary winding 17 and condenser 20 a rapidly diminishing oscillatory discharge current flows through the local circuit including only these elements.

The flow and direction of flow of unbalanced potentiometric current through the circuit branch from the point 15 intermediate the resistances 8 and 9 and including the filter 16, inductance 19, transformer primary winding 17, device 14, conductor 4, thermocouple 2, conductor 5, and the portion of resistance 13 at the right of bridging contact 7 depends upon the relation between the electromotive force produced by the thermocouple 2 and the potential difference between the potentiometric network points 12 and 15. The thermocouple 2 is so connected to the potentiometer circuit that the electromotive force of the thermocouple opposes the potenial difference beween the network points 12 and 15. The potential difference between the points 12 and 15 is decreased and increased by movement of the contact 7 to the left and to the right, respectively. With a suitable adjustment of the contact 7 the potential difference between the points 12 and 15 will be equal and opposite to the electromotive force produced by the thermocouple 2 and no current will flow through the above mentioned circuit branch including the thermocouple 2. On an increase in the thermocouple electromotive force above the potential difference between the points 12 and 15 a resultant current will flow in one direction through the interrupter 14 and transformer primary winding 17 and such current flow may then be eliminated by a suitable adjustment of the bridging contact 7 to the right. Such adjustment increases the potential difference produced between the potentiometric network points 12 and 15 and opposed to the thermocouple electromotive force and when of proper magnitude reduces the resultant current flow to zero. Conversely, when the electromotive force of the thermocouple 2 falls below the potential difference between the potentiometer points 12 and 15 the resultant current flow through the interrupting device 14 and transformer primary winding 17 will be in such direction that it may be eliminated by a suitable adjustment of the bridging contact 7 to the left. Adjustment of contact 7 to the left decreases the potential difference opposed to the thermocouple electromotive force, and when of proper magnitude, decreases to zero the resultant current flow.

As is illustrated more or less diagrammatically in the drawings, the bridging contact 7 is adjusted along the slidewire resistances 6 and 13 by the operation of a reversible electrical motor 21 which is shown as having its rotor mechanically coupled to a threaded shaft 22 on which a carriage 23 which supports the bridging contact 12 is mounted. Thus, the bridging contact 12 is adjusted longitudinally of the shaft 22 in one direction or the other according to the direction of rotation of the reversible electrical motor 21. The reversible electrical motor 21 has terminals 24 and 25 connected to the output terminals of the electronic amplifying means referred to above and has other terminals 26 and 27 connected to alternating current supply conductors L¹ and L² which also supplies energizing current to the electronic amplifying means.

If desired, a pen may be mounted on the carriage 23 which carries the potentiometer bridging contact 7 and arranged in cooperative relation with a recorder chart 28 to thereby provide a continuous record of the temperature of the interior of the furnace 3. The chart 28 may be a strip chart as shown and is adapted to be driven in any convenient manner as, for example, by a unidirectional electrical motor (not shown) through suitable gearing so that a record of the temperature to which the thermocouple 2 is subjected will be recorded as a continuous line on the chart.

For its intended use the motor 20 may be of the form diagrammatically shown in the drawings and comprising a rotor, two pairs of oppositely disposed field poles (not shown) on one pair of which a winding 29 is wound and on the other pair of which a winding 30 is wound. Winding 30 is connected to the terminals 26 and 27 of the motor and is supplied with energizing current from the alternating current supply conductors L¹ and L² through a condenser 31 of suitable value. Due to the action of the condenser 31 the current which flows through the winding 30 will lead the line current by approximately 90°. Pulsating current is supplied the winding 29 by the electronic amplifying means referred to and this current is in phase with or is displaced 180° in phase with respect to the supply line voltage and establishes a field in the rotor which is displaced 90° in one direction or the other with respect to that established therein by the winding 30. Reaction between the field set up by the winding 30 with that set up by winding 29 establishes a rotating field in the rotor which rotates in one direction or the other depending upon whether the winding 29 is energized with current in phase with the supply line voltage or displaced 180° in phase therewith, and thereby, as is explained in detail hereinafter, in accordance with the direction of unbalance of the potentiometric measuring network 1. The direction and duration of rotation of the motor is controlled in accordance with the direction and extent of unbalance of the potentiometric measuring network 1 so that on motor rotation the bridging contact 7 is adjusted in the proper direction to reduce the potentiometric unbalance.

Figure 2:
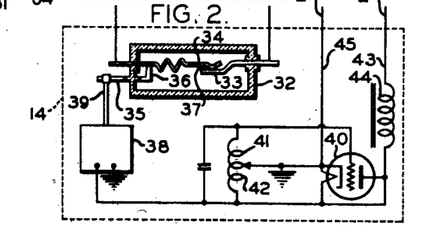
Fig. 2 illustrates in detail a form of current interrupter device that may be employed in the conversion circuit of the arrangement of Fig. 1.

The circuit interrupting device 14, shown schematically in Fig. 1 is illustrated in more detail in Fig. 2 and is utilized for periodically impressing the potentiometric unbalanced unidirectional potential on the condenser 20 to create a succession of rapidly vanishing oscillatory discharge current waves in the local circuit including the condenser 20 and the transformer primary winding 17 which are capable of being readily amplified. In Fig. 3 the full line curve A illustrates the oscillatory discharge current flow in winding 17 when the potential impressed on condenser 20 is of one polarity and the dotted curve B shows the oscillatory discharge current flow when the potential impressed on condenser 20 is of opposite polarity. The manner in which these oscillatory discharge current flows are utilized to control the rotation and direction of rotation of motor 21 is explained hereinafter. It will be understood that any desired form of interrupter, for example, a reed type interrupter or vibrator, having the same operation characteristics as the interrupter 14 shown in detail in Fig. 2 may be utilized, if desired.

The circuit interrupting device 14 disclosed in Fig. 2 includes a vacuum tube 32 in which metal contacts 33 and 34 are arranged. The tube 32 is preferably formed of glass and has one end resiliently formed integral with a rod 35 the right end 36 of which normally rests against the underside of the metal contact 34 so that upon movement of the left end of rod 35 downward, the contact 34 is raised out of engagement with the contact 33 to break the circuit at the point 37. As soon as the rod 35 is released the contact 34 will again move into engagement with contact 33 to close the circuit.

The rod 35 may be raised and lowered in any convenient manner and by way of example a radio loudspeaker element 38 may be employed for this purpose. The loudspeaker element 38 is connected by means of a link 39 to the rod 35 whereby the rod 35 will be rapidly raised and lowered, as the loudspeaker vibrates, thereby making and breaking the circuit at point 37.

In order to operate the loudspeaker element at the desired high frequency there is provided an electron discharge device 40 having anode, grid, cathode and heater filament elements. The electron discharge device 40 is electrically connected in a suitable manner so as to oscillate at the frequency it is desired to vibrate the loudspeaker element and thereby open and close the circuit at point 37. The oscillatory condition is promoted by an electrical interlinkage between the grid or input circuit and the plate or output circuit of device 40. This interlinkage is an inductive one and is obtained by means of two inductively associated windings or coils 41 and 42 which are connected respectively in the grid and anode circuits.

It will be understood that any suitable electrical energizing connections for the electron discharge device 40 may be used, and in Fig. 2 it is energized from a suitable source of alternating voltage. When the electron discharge device 40 has a line voltage filament, it may be energized directly from the alternating current supply conductors $L^1$ and $L^2$, as shown. The supply conductor $L^1$ is connected by a conductor 43, in which an inductive choke 44 is inserted, to the anode and to one terminal of both the heater filament and the inductive coil 42. The supply conductor $L^2$ is connected by a conductor 45 to the other terminal of the heater filament, to the other terminal coil 42, to the cathode of device 40, and to one end of inductive coil 41. It will be observed that the heater filament and inductive choke 44 are connected in series across the supply conductors $L^1$ and $L^2$. The characteristics of the electron discharge device 40, the voltage of the supply conductor $L^1$ and $L^2$, and the inductive choke 44 are so related with respect to each other that the desired anode voltage is obtained and also that the desired current flows through the heater filament.

In accordance with the present invention the electrical constants of the transformer primary winding 17 and the condenser 20 are so related to each other as to satisfy the condition of $R^2 < 4 L/C$ where R is the resistance in ohms of the local circuit including the elements 17 and 20, L is the inductance in henries of the transformer primary winding 17, and C is the capacitance in farads of the condenser 20. It can be shown mathematically that when this condition is satisfied a rapidly vanishing oscillatory discharge current will flow through the local circuit including elements 17 and 20 whenever a unidirectional potential is impressed on the parallel connected winding 17 and condenser 20. For example, see pages 140 and 141 of the text "An Elementary Treatise on Differential Equations", (2d ed. 1933) by Abraham Cohen and published by D. C. Heath and Company. The desired frequency of oscillation of this discharge current flow may be obtained by proper selection of the circuit constants R, L and C. It will be noted that the frequency of oscillation may be a very high frequency, for example of the order of radio frequencies.

The production of such an oscillatory discharge current flow through the transformer primary winding 17 and condenser 20 will occur during each engagement and disengagement of the interrupter contacts 33 and 34 so long as such engagement and disengagement is operative to effect a change in the potential impressed on the parallel connected elements 17 and 20. That is to say, when the potentiometric network 1 is unbalanced in the direction to render the network point 15 positive with respect to the network point 12, closure of the interrupter contacts 33 and 34 operates to impress this potential on the parallel connected winding 17 and condenser 20 and thereby tends to render the upper terminal of the parallel connection positive with respect to the lower terminal. The electrical characteristics of the parallel connected elements 17 and 20 are such that they tend to resist changes in electric potential thereacross and as a result the potential across these elements is not instantaneously changed an amount corresponding to the difference in potential between the potentiometric network points 12 and 15. Instead the potential change is gradual and is accompanied by an oscillatory discharge between winding 17 and condenser 20 which gradually vanishes as the potential across the parallel connected elements approaches the potential difference between the potentiometric network points 12 and 15. Such decay of the oscillatory discharge is completed during the time that the contacts 33 and 34 of interrupter 14 are closed, as is illustrated in Fig. 3.

In Fig. 3 the distance between vertical lines C and D indicates the time during which the contacts 33 and 34 are in engagement. It will be noted that during this time the oscillating wave A (which for purposes of illustration is presumed to be created for the condition of potentiometric unbalance considered, namely when the potentiometric network point 15 is positive with respect to the point 12) diminishes and becomes practically negligible within the time C—D.

When the contacts 33 and 34 of the interrupter 14 are opened to disconnect the unbalance potentiometric potential from winding 17 and condenser 20, a similar oscillatory discharge occurs in the local circuit including elements 17 and 20. This oscillatory discharge gradually diminishes as the energy stored in the condenser 20 and winding 17 dissipates itself and becomes practically negligible during the time that the contacts 33 and 34 are disengaged. Since the space between vertical lines D and E in Fig. 3 illustrates the time during which the contacts 33 and 34 are disengaged, it will be noted that the oscillating wave A is diminished before the contacts 33 and 34 are again closed.

It will be observed that for the direction of potentiometric network unbalance considered the successive oscillating current waves established in the transformer primary winding 17 and condenser 20 commence at a maximum positive value irrespective of whether that oscillating wave is created as a result of engagement or disengagement of the interrupter contacts 33 and 34. When the potentiometric network 1 is unbalanced in the opposite direction to render the network point 12 positive with respect to the point 15 and thus cause a unidirectional potential of opposite polarity to be impressed on the parallel connected winding 17 and condenser 20 whenever the interrupter contacts 33 and 34 are closed, however, the successive oscillating waves created upon successive engagements and disengagements of contacts 33 and 34 and indicated by the reference character B, commence at a maximum negative value. Thus, the oscillating waves created for the second mentioned direction of potentiometric unbalance are exactly 180° out of phase with the oscillating waves created for the first mentioned direction of potentiometric unbalance. The frequency of the oscillating waves is the same in each case inasmuch as the circuit constants of the local oscillating circuit 17 and 20 are the same irrespective of the direction of potentiometric unbalance.

When the potentiometric network 1 is exactly balanced, and therefore, no potential is impressed across the parallel connected winding 17 and condenser 20, operation of the interrupter 14 is ineffective to cause an oscillatory discharge in the circuit including winding 17 and condenser 20.

Inductance 19 is provided in the circuit as shown to prevent the oscillatory discharge current flow in the elements 17 and 20 from flowing through the filter 16 and thermocouple 2 to the potentiometric network 1.

The oscillating current flow established in the transformer primary winding 17 upon unbalance of the potentiometric network 1 in one direction or the other produces a corresponding oscillating current flow in the secondary winding 46 of the transformer 18. To facilitate the induction of such an oscillating current flow in secondary winding 46, the latter is tuned by a condenser 47 to the same frequency to which the circuit including elements 17 and 20 is tuned.

This oscillating potential produced across the transformer secondary winding 46 is amplified by a suitable electronic amplifier 48, the output terminals of which are connected through a condenser 49 to a resistor 50. As a result an oscillating potential is produced across the resistance 50 which corresponds to the oscillating potential induced in the transformer secondary winding 46 but is greatly amplified with respect to the latter.

The oscillating potential thus produced across the resistance 50 is applied by conductors 51 and 52 to the input circuit of a heater type electronic valve 53. The electronic valve 53 is a twin type amplifier valve and includes two triodes in the same envelope. One of the triodes includes an anode 54, a control electrode 55, a cathode 56 and a heater filament 57, and the other of the triodes includes an anode 58, the control electrode 59, a cathode 60, and a heater filament 61.

Transient oscillating anode voltage of the same frequency as that of the transient oscillating potential produced across the resistance 50 is applied to the electronic valve 53 from the secondary windings 62 and 63 of an air core transformer 64 having a primary winding 65. More specifically, the transformer secondary winding 62 supplies a transient oscillating anode voltage to the triode including the anode 54 which is in phase with the transient oscillating potential produced across the resistor 50 upon unbalance of the potentiometer network in the direction to render the network point 15 positive with respect to the point 12, for example, through a circuit which may be traced from the cathode 56 to a conductor 66, a contact 67 which is slideable along a resistance 68, the portion of resistance 68 to the left of contact 67, as seen in the drawings, and which is shunted by a condenser 69, the transformer secondary winding 62 and a conductor 69a to the anode 54. A transient oscillating anode voltage which is displaced 180° in phase with respect to the voltage applied to the anode 54 is supplied the triode including the anode 58 from the transformer secondary winding 63 through a circuit which may be traced from the cathode 60 to the conductor 66, contact 67, the portion of resistance 68 to the right of contact 67 and which is shunted by a condenser 71, the transformer secondary winding 63 and a conductor 72 to the anode 58. It will be noted that the cathodes 56 and 60 of valve 53 are connected together as are also the control electrodes 55 and 59 thereof.

When an oscillating potential of one phase is produced across the resistance 50 one triode or the other of valve 53 will be rendered more conductive than the other to thereby produce a potential drop across the portion of resistance 68 to the left of contact 67 which is different from that produced across the portion of resistance 68 to the right of contact 67. The condensers 69 and 71 are provided across the portions of resistance 68 to the left and right of contact 67, respectively, for the purpose of smoothing out the ripple in the potential drops produced across these resistance portions by the flow of current therethrough from the electronic valve 53.

In accordance with the present invention anode voltage for the electronic valve 53 is derived from an oscillating circuit in which oscillatory discharge current flows are established under control of the operation of the interrupter switch 14. This oscillating circuit includes the primary winding 77 of a transformer 76 and a condenser 79 which is connected in parallel to the winding 77. A variable portion of the potential drop which is maintained across a slide wire resistance 70 by a battery 74 is impressed on this oscillating circuit through a circuit which may be traced from the upper end of resistance 70 as seen in the drawings, interrupter switch 14, the parallel connected elements 77 and 79 and an inductance 73 to a contact 75 which is in slidable engagement with the resistance 70. Inductance 73 is provided to prevent the oscillatory discharge current in winding 77 and condenser 79 from flowing back through slide wire resistance 70 and battery 74. A rheostat is provided in circuit with the battery and the slide wire resistance 70 for facilitating the adjustment of the potential drop maintained across resistance 70 by battery 74 to the desired value. Preferably the voltage impressed on the parallel connected winding 77 and condenser 79 from the resistance 70 is somewhat greater than the largest unbalanced potential which is derived in the potentiometric network 1.

The constants of the oscillating circuit including the transformer primary winding 77 and the condenser 79 are so chosen that whenever the contacting members 33 and 34 of the interrupter switch 14 are opened or closed, a rapidly vanishing oscillatory discharge current is established in the oscillating circuit. Further, the constants are so chosen that the frequency of oscillation of this discharge current is the same as the frequency of the oscillatory discharge current which is established in the oscillating circuit including transformer primary winding 17 and condenser 20 upon opening and closing of the contacting members 33 and 34 of switch 14. The oscillatory discharge current established in the oscillating circuit including elements 77 and 79 has been illustrated in Fig. 3 by the curve F. Since this latter oscillatory discharge current is established as a result of opening and closing of the same contacting members which establishes the oscillatory discharge current in the oscillating circuit including elements 17 and 20, namely, contacting members 33 and 34 of switch 14, the oscillatory discharge current established in the circuit including members 77 and 79 will be either in phase with or 180° out of phase with the oscillatory discharge current established in the circuit including elements 17 and 20 depending upon the direction of unbalance of the potentiometric network 1. As will be noted by reference to Fig. 3, an oscillatory discharge current is established in the oscillating circuit including winding 77 and condenser 79 upon each engagement and disengagement of the contacts 33 and 34 of the switch 14. In addition, the oscillatory discharge current which is so produced, rapidly vanishes and becomes practically negligible during each interval of engagement or disengagement of the contact members 33 and 34.

The oscillatory discharge current flow thus established in the transformer primary winding 77 produces a corresponding oscillating potential in the secondary winding 78 which is provided on the transformer 76 in inductive relation to the winding 77. The transformer secondary winding 78 is tuned by a condenser 80 to the frequency of the oscillating current flow in the winding 77.

The oscillating potential produced in the transformer secondary winding 78 is amplified by a suitable electronic amplifier 81 having a pair of input terminals to which the winding 78 is connected and having a pair of output terminals to which the primary winding 65 of transformer 64 is connected. It should be observed that since the polarity of the potential maintained across the slide wire resistance 70 by the battery 74 is constant, the phase of the transient oscillating potential introduced into the transformer secondary winding 78 and consequently in the secondary windings 62 and 63 of transformer 64 always remains constant. The secondary windings 62 and 63 are so connected to the output circuits of the triodes of valve 53 that the transient oscillating potential impressed on the anode 54 is exactly 180° out of phase with the oscillating potential applied to the anode 58.

The electronic amplifiers 48 and 81 for amplifying the transient oscillating potentials established in the transformer secondary windings 46 and 78, respectively, may be of any suitable type and for example may be so-called intermediate frequency amplifiers. Direct current energizing voltage for the amplifiers 48 and 81 is derived from a suitable rectifier which is generally designated by the reference numeral 82 and which in turn is energized by alternating current derived from the alternating current supply conductors L¹ and L².

Direct current energizing voltage for heating the filaments 57 and 61 of valve 53 is also obtained from rectifier 82. The connections through which this voltage is applied to heater filaments 57 and 61 from rectifier 82 have not been shown in order not to confuse the drawings.

The potential drop produced across the portion of resistance 68 to the left of contact 67 is applied to the input circuit of one triode of a heater type electronic valve 83 having a second triode on the input circuit of which the potential produced across the right hand portion of resistance 68 is applied. The first mentioned triode of the electronic valve 83 includes an anode 84, a control electrode 85, a cathode 86, and a heater type filament 87. The second mentioned triode includes an anode 88, a control electrode 89, a cathode 90, and a heater type filament 91. Energizing current is supplied the heater filaments 87 and 91, which are connected in parallel, from the low voltage secondary winding 92 of an iron core transformer 93 having a line voltage primary winding 94 and a high voltage secondary winding 95 in addition to the low voltage secondary winding 92.

Anode voltage is supplied the triode including the anode 84 from the transformer secondary winding 95 through a circuit which may be traced from the left end of the winding 95 to the anode 84, the cathode 86, and a conductor 96, in which the field winding 29 of motor 21 is connected, to a center tap on the transformer secondary winding 95. A tuning condenser 97 is connected across the motor field winding 29. Anode voltage is supplied to the triode including the anode 88 through a circuit which may be traced from the right end of the transformer secondary winding 95 to the anode 88, cathode 90, conductor 96, and the motor field winding 29 to the center tap on the winding 95.

As shown, the cathodes 86 and 90 of the valve 83 are both connected to the contact 67 which is in engagement with resistance 68. One end of the resistance 68 is connected to the control electrode 85 of valve 83 and the other end of the resistance 68 is connected to the control electrode 89.

The motor driving circuit disclosed in Fig. 1 is disclosed and is being claimed in the Wills application Serial No. 421,173 which was filed December 1, 1941. Therefore, for the present purposes, it is believed sufficient to note that the motor 21 is preferably so constructed that the impedance of the winding 29 is of the proper value to match the impedance of the anode circuits of the triodes of valve 83 when the motor is operating in order to obtain the most efficient operation. Preferably, the motor is so constructed that it has a high ratio of inductance to resistance, for example, of the order of from 6 to 1 to 8 to 1 at the frequency of the energizing current supplied to it. This provides for maximum power during the running condition of the motor with the least amount of heating and also provides a low impedance path for braking purposes.

As noted hereinbefore energizing current is supplied to the motor winding 30 from the alternating current supply conductors L¹ and L² through the condenser 31. The condenser 31 is so selected with respect to the motor winding 30 as to provide a series resonant circuit having a unity power factor. Due to the series resonant circuit, the total impedance of the circuit including winding 30 and condenser 31 is substantially equal to the resistance of the winding 33 and since this resistance is relatively low, a large current flow through the winding 30 is made possible. This permits the attainment of maximum power and torque from the motor 10. Due to the series resonant circuit, the current flow through the motor winding 30 is in phase with the voltage of the supply conductors L¹ and L². The voltage across the motor winding 30, however, leads the current by substantially 90° because of the inductance of the winding 30.

Energizing current is supplied the motor winding 29 through the anode circuits of the triodes of valve 83 which were previously traced. The condenser 97 connected in parallel with the winding 29 is so chosen as to provide a parallel circuit having a unity power factor. This parallel resonant circuit presents a relatively high external impedance and a relatively low local circuit impedance. The relatively high external impedance is approximately the same as the impedance of the anode circuits of the triodes of valve 83 and thereby provides efficient operation. The relatively low or internal circuit impedance approximates the actual resistance of the winding 29 and since this resistance is relatively low, the impedance of the local circuit is relatively low.

During the first half cycle of the alternating voltage produced across the terminals of the transformer secondary winding 95 the anode 84 of valve 83 is rendered positive with respect to the center tap on the winding 95 and during the second half cycle the anode 88 is rendered positive with respect to the center tap on the winding 95. Accordingly, the triodes of valve 83 are arranged to conduct on alternate half cycles.

For the condition when the potential drop across the portion of resistance 68 to the left contact 67 is the same as the potential drop across resistance 68 to the right of contact 67, the potentials of the control electrodes 85 of valve 87 will be exactly the same and therefore the conductivity of the triode including anode 84 will be the same as the conductivity of the triode including anode 88. Pulses of current of equal magnitude will then flow in the motor winding 29 from the anode circuits of the triodes of valve 83 during each succeeding half cycle of the alternating voltage supplied by the transformer secondary winding 95. Thus, for the condition under consideration pulsating direct current of twice the frequency of the alternating voltage supplied by the transformer secondary winding 95 is supplied the motor winding 29. When thus energized, the motor 21 is not effectively urged to rotation in either direction and remains stationary. Due to the relatively high direct current component of the current then flowing through the motor winding 29 the core structure of the motor 21 tends to be saturated whereby the inductive reactance of the motor winding 29 is relatively small. The condenser 97 is so selected that the condenser in parallel with the motor winding 29 then forms a parallel resonant circuit with the latter. Such saturation of the core structure of motor 21 operates to exert an appreciable damping effect on the rotor of the motor, that is, an effect tending to prohibit rotation of the motor. Thus, if the motor had been rotating, such saturation of the core structure will operate to quickly stop the motor rotation. When the potential drop across the portion of resistance 68 to the left of the contact 67 is rendered different from the potential drop across the portion of that resistance to the right of contact 67, the magnitude of the pulses of current flowing through the motor winding 29 from one triode of valve 83 will be increased and the magnitude of the pulses of current flowing through the winding 29 from the other triode will be decreased. When the motor field winding 29 is thus energized, the direct current component of the current flowing through the motor winding 29 is decreased whereby the saturation of the motor core structure and the consequent motor damping effect is reduced. In addition, the alternating component of the current supplied the winding 29 is increased. This alternating component produces an alternating field in the motor core structure which reacts with that established by the motor winding 30 to produce a rotating field in the motor. This rotating field rotates in one direction or the other depending upon the direction of potentiometric unbalance and effects actuation of the motor for rotation in a corresponding direction.

With the arrangement described, it will be noted that the potential drop maintained across the slide wire resistance 70 by the battery 74 also impresses a potential on the oscillating circuit including the transformer primary winding 17 and the condenser 20 through a circuit which may be traced from the upper end of resistance 70 to conductor 4, thermocouple 2, conductor 5, potentiometric network 1, filter 16, inductance 19, the parallel connected elements 17 and 20, the parallel connected elements 77 and 79 and the inductance 73 to the contact 75 which is in engagement with the resistance 70. Such a potential is established on the parallel connected elements 17 and 20 only during the intervals when the contact members 33 and 34 of the interrupter switch 14 are out of engagement with each other. During the intervals when these contact members are in engagement, the portion of the circuit just traced and including the potentiometric 1, the thermocouple 2, filter 16 and the parallel connected elements 17 and 20 is shunted by the contact numbers 33 and 34 and therefore, during these intervals no potential is impressed on the parallel connected elements 17 and 20 from the slide wire resistance 70. The result of the potential impressed on the parallel connected elements 17 and 20 from the slide wire resistance 70 during the intervals at the contacts 33 and 34 are out of engagement is to establish an oscillatory discharge current flow through the primary winding 17 and condenser 20, irrespective of the state of balance of the potentiometric network 1. Since the potential drop impressed across slide wire resistance 70 by battery 74 remains constant, the oscillatory discharge current flow produced in the primary winding 17 and therefore the transient oscillating potential induced in the transformer secondary winding 46 also remains constant. Consequently, a constant transient oscillating current flow is established at the resistance 50 which operates to render one triode of the electronic valve more conductive than the other triode even when the potentiometric network 1 is precisely balanced. If the contact 67 were then maintained half way between the ends of resistance 68, the potential drop across the left half of resistance 68 would consequently be different from that across the right half. Under this condition the reversible motor 21 would be energized for rotation in one direction or the other. Such operation is undesired and in accordance with the present invention is obviated by adjusting the contact 67 along the slide wire resistance 68 so that the potential drop across the portion of resistance 68 to the left of contact 67 is exactly the same as the potential drop across the portion of resistance 68 to the right of the contact 67. When the contact 67 is so adjusted along the length of resistance 68 the potential of the control electrode 85 of valve 83 will be exactly the same as the potential control electrode 89 and as a result, the motor 21 will not be energized for rotation in either direction. If desired, a battery of suitable value may be connected in the conducting lead from one or the other control electrode of valve 83 to the corresponding end of resistance 68 to provide a bias potential to achieve this result.

Upon unbalance of the potentiometric network 1 in one direction or the other, a transient oscillatory discharge current will be established in the transformer primary winding 17 during the intervals when the contacts numbers 33 and 34 of interrupter switch 14 are in engagement and this oscillatory discharge current flow will operate to produce a corresponding transient oscillating potential across the resistance 50 which is effective to change the relative conductivities of the two triodes of valve 53 and thereby to effect a change in the potential drop across the portion of resistance 68 to the left of contact 67 in comparison to the potential drop across the portion of resistance 68 to the right of contact 67. This will operate to produce a change in the potential of the control electrode 85 of valve 83 relative to the potential of the control electrode 89, and therefore, cause the motor 21 to be energized for rotation in one direction or the other, depending upon the direction of potentiometric network unbalance. Thus, the undesired effect introduced into the operation of the apparatus of a potential being impressed across the operating circuit including elements 17 and 20 from the slide wire resistance 70 may be readily compensated for and cancelled out by suitable adjustment of the contact 67 along the slide wire resistance 68.

In the use of the invention in the form shown in Fig. 1 of the drawings it may also be desirable to eliminate effects due to stray alternating electromotive forces of high frequency which may be impressed on the potentiometric measuring circuit as a result of alternating current flows in the alternating supply lines L¹ and L² or in other electrical apparatus which may be located near the potentiometric measuring network. Such disturbing effects may be eliminated by the use of the filter 16 which comprises suitable condensers and a resistance connected into the potentiometric measuring circuit as shown.

In the use of the present invention the filter 16 may not eliminate the undesired stray alternating electromotive forces to a sufficient degree, and in such case such undesirable electromotive forces may be substantially completely eliminated by means of an arrangement including an electronic amplifier 98 having input terminals 99 and 100 and output terminals 101 and 102. The input terminals of the amplifier 99 are connected across the output terminals 103 and 104 of the filter 16 and the output terminals of the amplifier 99 are connected across the input terminals 105 and 106 of the filter 16. The output terminals of the amplifier 98 are so connected to the input terminals of the filter 16 that the phase of the output voltage of the amplifier 98 is displaced 180° from the alternating voltage extraneously induced in the potentiometric measuring network 1, and therefore, operates to neutralize or effectively cancel out the extraneously induced voltages which may leak through the filter 16.

The measuring circuit arrangement disclosed in Fig. 1 is characterized in that the frequency at which the circuit interrupter 14 operates to interrupt its associated circuit is not critical and need not be maintained constant since the frequencies of the transient oscillating voltages induced in the secondary windings 46 and 78 of the air core transformers 18 and 76 are dependent only on the frequency to which the oscillating circuit associated therewith is tuned. Furthermore, since the transformers 18 and 76 are air core transformers, the tendency of extraneous alternating currents to be induced directly in the input circuits of the amplifiers 48 and 81 is practically negligible.

It will be apparent that the reversible electrical motor 21 may be employed to operate a valve 107 positioned in a fuel supply pipe 108 to the furnace 3 for varying the supply of heating agent to the furnace 3, or preferably, a separate reversible electrical motor may be so employed. For example, as illustrated in Fig. 1 of the drawings, a reversible electrical motor 109 having two opposed field windings (not shown) may be used for this purpose. The reversible motor 109 is mechanically connected in any suitable manner to the valve 107 and is adapted to adjust the latter to its open or closed position depending upon the direction to which the motor 109 is energized for rotation. The mechanical connection of the motor 109 to the valve 107 is such as to increase and decrease the supply of heating agent to the furnace 3 as the furnace temperature falls below or rises above a predetermined level.

The motor 109 is energized for rotation in one direction or the other depending upon which of the two opposed field windings is energized by means of a switch 110. As illustrated in Fig. 1, current flows from the alternating current supply line L¹ through a conductor 111 to a switch arm 112 which is insulated from but may be carried by the carriage 23 which carries the potentiometer slidewire contact 7, thence by either of two opposed contacts 113 or 114, conductors 115 or 116 and one field winding or the other field winding of motor 109 to the supply line L². Although not shown the contacts 113 and 114 of the switch 110 are made adjustable so that both the control point setting and sensitivity of the apparatus may be set in a manner well known in the art.

Figure 4:
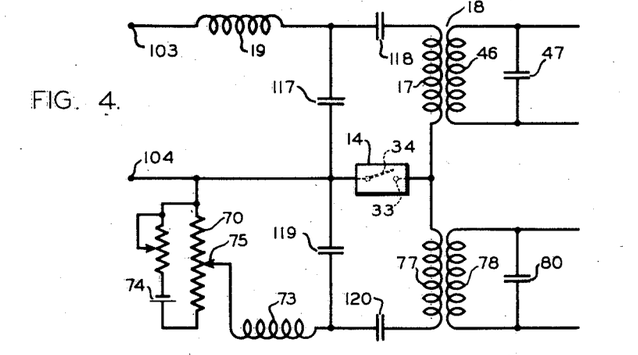
Fig. 4, 5 and 6 illustrate modifications of the conversion circuit of Fig. 1.
Figure 5:
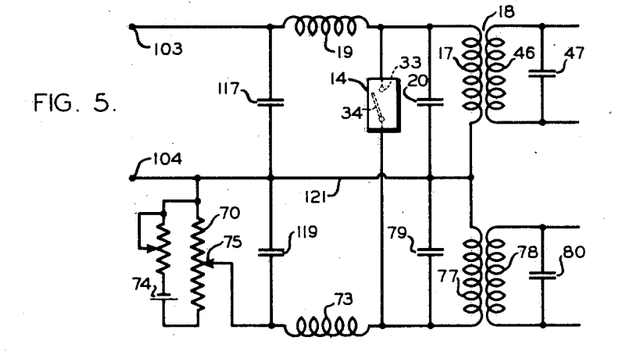
Figure 6:
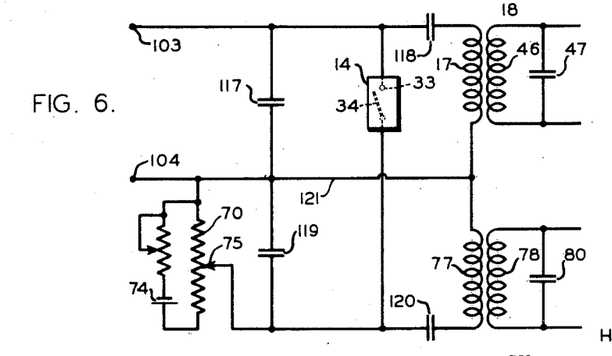

In Figs. 4, 5 and 6 I have illustrated, more or less, diagrammatically modifications of the conversion circuit of the arrangement of Fig. 1 for translating the unbalanced potentiometric direct currents into transient oscillating currents which may be readily amplified and also for producing a reference transient oscillating current for energizing the anode circuits of the triodes of valve 53.

The terminals 103 and 104 in the modification of Fig. 4 designate the correspondingly identified output terminals of the filter 16 of Fig. 1. Thus in Fig. 4 as in Fig. 1 the unbalanced potentiometric direct currents are impressed on the terminals 103 and 104. The unbalance potential derived from the potentiometric network 1 is applied through an inductance 19 across the terminals of a condenser 117. The upper terminal of condenser 117 is connected through a condenser 118, the primary winding 17 of transformer 18, and contacts 33 and 34 of the interrupter switch to the lower terminal of condenser 117. The condenser 117 is preferably much larger in capacity than the condenser 118. The condenser 118 is so selected in relation to the inductance of winding 17, as is the condenser 20 of Fig. 1, as to satisfy the condition of $$R^2 < \frac{4L}{C}$$

By satisfying this condition, a rapidly vanishing oscillatory discharge current will flow through the local circuit including elements 117, 118, 17 and 14 when a unidirectional potential is impressed upon the condenser 117 upon each engagement and disengagement of the contact members 33 and 34 of the switch 14. The character of this oscillatory discharge current may be exactly the same as the character of the oscillatory discharge current produced by means of the conversion circuit of the arrangement Fig. 1 and illustrated in Fig. 3.

In Fig. 4, the potential tapped off slide wire resistance 70 is impressed on a condenser 119 through inductance 73. The condenser 119 is included in an oscillating circuit which may be traced through the lower terminal of condenser 119 through a condenser 120, the transformer primary winding 77 and the interrupter switch 14 to the upper terminal of condenser 119. The condenser 119 is preferably of much larger capacity than the condenser 120 and the latter is so selected in relation to the inductance of the transformer primary winding 77 as to permit the discharge of an oscillatory current in the circuit including elements 14, 119, 120 and 77 whenever the contact members 33 and 34 of switch 14 move into and out of engagement. The condenser 120 is so selected that the frequency of this oscillatory discharge current will be the same as that established in the transformer primary winding 17.

In the modification disclosed in Fig. 5, the unbalance potentials from the potentiometric network 1 which appear across the filter output terminals 103 and 104 are impressed on a condenser 117. The potential so produced on the condenser 117 is impressed on an oscillating circuit including the parallel connected transformer primary winding 17 and condenser 20 through a circuit which may be traced from the upper terminal of condenser 117 through inductance 19 to the parallel connected elements 17 and 20 and through a conductor 121 to the lower terminal of condenser 117.

Similarly, the potential tapped off slide wire resistance 70 is impressed across the terminals of a condenser 119 and the potential produced on condenser 119 is impressed on the oscillating circuit including the parallel connected transformer primary winding 77 and condenser 79 through a circuit which may be traced from a lower terminal of condenser 117 through inductance 73 to the parallel connected elments 77 and 79 and conductor 121 to the upper terminal of condenser 119. In this modification the contact member 33 of the interrupter switch 14 is connected to the upper terminal of the parallel connected elements 17 and 20 and the contact member 34 is connected to the lower terminal of the parallel connected elements 77 and 79.

When the contact members 33 and 34 are opened, the potential across condenser 117 is impressed on the parallel connected elements 17 and 20 to cause the establishment of an oscillatory discharge current in the local circuit including elements 17 and 20 and the potential across condenser 119 is impressed on the parallel connected elements 77 and 79 to cause the establishment of an oscillatory discharge current through the last mentioned elements. When the contact members 33 and 34 are moved into engagement with each other, the upper terminal of elements 17 and 20 is directly connected to the lower terminal of elements 77 and 79. This operation will cause the potentials on the condensers 20 and 79 to equalize. As will be apparent to those skilled in the art the change in potential across the condensers 20 and 79 effects the establishment of an oscillatory discharge current in each of the oscillating circuits. Accordingly, an oscillatory discharge current is established in each of the oscillating circuits upon each engagement and disengagement of the contact members of the switch 14.

In Fig. 6, the unbalanced potentiometric potentials are impressed on the condenser 117 and the potential derived from the slide wire resistance 70 is impressed on the condenser 119. The condenser 117 is connected in an oscillating circuit which may be traced from the upper terminal of condenser 117 through a condenser 118 the primary winding 17 of transformer 18 and conductor 121 to the lower terminal of condenser 117. Similarly, the condenser 119 is connected to an oscillating circuit which may be traced from the lower terminal of condenser 119 through condenser 120, transformer primary 127 and conductor 121 to the upper terminal condenser 119. The condenser 118 is so chosen in relation to the inductance and resistance of winding 17 as to permit the establishment of an oscillating discharge current through the winding 17 when a potential is impressed on the condenser 117 and likewise the condenser 120 is so chosen in relation to the resistance and inductance of the winding 77 as to permit the production of an oscillatory discharge current through the winding 77 when a potential is impressed on the condenser 119.

In this modification, the interrupter switch 14 is connected between the left end terminal of the condenser 118 and the left end terminal of condenser 120. When the switch 14 is opened, the potential established on the condenser 117 by the potentiometric network unbalance causes an oscillatory discharge current through the transformer primary winding 17. Similarly, the potential on condenser 119 then establishes an oscillatory discharge current through the transformer primary winding 77. When the contact members of switch 14 are moved into engagement, the potential across the transformer primary winding 17 and condenser 118 is equalized to that across the transformer primary winding 77 and the condenser 120. Such equalization also causes the establishment of an oscillatory discharge current in the primary winding 17 and also in the primary winding 77.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The method which comprises producing an electromotive force to be measured having a very low frequency component which is difficult of direct amplification, opposing said electromotive force to a known electromotive force, deriving from the resultant of said electromotive forces a succession of waves of transient oscillatory currents, amplifying said oscillatory currents, and applying the amplified currents to effect a balance between said opposed electromotive forces.

2. The method of balancing a potentiometer to measure a current which is difficult of direct amplification and the variations of which are operative to unbalance said potentiometer to produce an unbalanced or resultant potentiometer current which comprises translating the resultant current from said potentiometer into a succession of waves of rapidly vanishing high frequency oscillatory currents, amplifying said oscillatory currents, and utilizing the amplified currents to control the balancing adjustment of the potentiometer.

3. The method which comprises producing an electromotive force to be measured having a very low frequency component which is difficult of direct amplification, opposing said electromotive force to a known electromotive force, translating the resultant of said electromotive forces into a succcession of waves of transient oscillatory currents of predetermined frequency and of one phase or of opposite phase depending upon the polarity of the resultant electromotive force, simultaneously producing an additional succession of waves of transient oscillatory currents of said predetermined frequency and in phase with said first mentioned oscillatory currents when the latter are of said one phase, applying said first mentioned oscillatory currents simultaneously to the input circuits of a pair of electronic valves, applying said additional oscillatory currents to the output circuits of said electronic valves in opposite phase relation, and controlling the magnitude of said known electromotive force in accordance with the difference between the magnitudes of the average current flows in the output circuits of said electronic valves.

4. The method of measuring an unknown unidirectional electromotive force of minute magnitude to eliminate the effects of extraneous fluctuating electromotive forces which are superimposed upon said unidirectional electromotive force which consists of the steps of opposing said electromotive force to a known unidirectional electromotive force, filtering the resultant of said electromotive forces to remove substantially all of the extraneous electromotive forces, detecting and amplifying the extraneous electromotive forces present in the filtered resultant electromotive force and superimposing the amplified quantity on the unfiltered resultant electromotive force in opposition to the extraneous electromotive forces, translating said filtered resultant electromotive force into a succession of waves of rapidly vanishing high frequency oscillatory currents, amplifying said oscillatory currents, and applying the amplified currents to effect a balance between said unknown and known electromotive forces.

5. The method of measuring an unknown electromotive force of minute magnitude to eliminate the effects of extraneous fluctuating electromotive forces which are superimposed upon said unknown electromotive force which consists of the steps of opposing said unknown electromotive force to a known electromotive force, filtering the resultant of said electromotive forces to remove substantially all of the extraneous electromotive forces, detecting and amplifying the extraneous electromotive forces present in the filtered resultant electromotive force and superimposing the amplified quantity on the unfiltered resultant electromotive force in opposition to the extraneous electromotive forces to render said resultant electromotive force substantially free from said extraneous electromotive forces, and applying the filtered resultant electromotive force to effect a balance between said unknown and known electromotive forces.

6. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said first mentioned electromotive force a reference electromotive force, means for translating the resultant of said electromotive forces into a succession of waves of transient oscillatory currents, an amplifier associated with said system to amplify said oscillatory currents, and means controlled by the amplified currents to effect a balance of said electromotive forces.

7. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a reference electromotive force, means for translating the resultant of said electromotive forces into transient oscillating currents which may be readily amplified, an amplifier associated with said system to amplify said transient oscillating currents, and means controlled by the amplified transient oscillating currents to effect balance of said electromotive forces.

8. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a reference electromotive force, means for translating the resultant of said electromotive forces into a succession of waves of rapidly vanishing high frequency oscillatory discharge currents comprising a circuit on which the resultant of said electromotive forces is applied and having connected in series therein a switch, and capacitive, resistive and inductive components, said switch being operative to periodically open and close said circuit, an amplifier associated with said system to amplify said oscillatory discharge currents, and means controlled by the amplified currents to effect a balance of said electromotive forces.

9. A self balancing system for the measurement of an electromotive force too small to directly effect control of said system and whose fluctuations in magnitude with time comprise components of frequency difficult of direct amplification comprising an electrical system upon which said electromotive force is impressed, means for opposing to said electromotive force a reference electromotive force to derive a resultant electromotive force, means for translating the resultant electromotive force into a succession of waves of transient oscillating currents of one phase or of opposite phase depending upon the polarity of said resultant electromotive force, and phase responsive means controlled by said oscillatory currents to effect a balance of said opposed electromotive forces.

10. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a variable reference electromotive force, means to vary said reference electromotive force including a reversible electrical motor, a source of electric current for energizing said motor, and means for controlling the application of said energizing current to said motor to selectively actuate the latter for rotation in one direction or the other including means for translating the resultant of said electromotive forces into a succession of waves of transient oscillatory currents of one phase or of opposite phase depending upon the polarity of said resultant electromotive force, means including electronic amplifying means to amplify said transient oscillatory currents and to produce a unidirectional potential of one polarity or of opposite polarity depending upon the phase of said transient oscillatory currents, and means controlled by said unidirectional potential to control the flow of energizing current from said source to said motor to actuate the latter for rotation in the direction to reduce said resultant electromotive force.

11. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a variable reference electromotive force, means to vary said reference electromotive force including a two phase reversible electrical motor, a source of alternating current for energizing one of the phases of said motor, and means for energizing the other phase of said motor to control the actuation thereof including means for translating the resultant of said electromotive forces into a succession of waves of transient high frequency oscillatory currents of one phase or of opposite phase depending upon the polarity of said resultant electromotive force, phase responsive means to produce a unidirectional potential of one polarity or of opposite polarity depending upon the phase of said oscillatory currents, means to translate said unidirectional potential into a fluctuating current of the same phase or of opposite phase as said alternating current source depending upon the polarity of said direct current potential and of the same frequency as said alternating current source, and means to apply said fluctuating current to the other phase of said motor.

12. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a reference electromotive force, means for translating the resultant of said electromotive forces into a succession of waves of transient oscillatory currents of predetermined frequency and of one phase or of opposite phase depending upon the polarity of said resultant electromotive force and for simultaneously producing an additional succession of waves of transient oscillatory currents of said predetermined frequency and in phase with said first mentioned oscillatory currents when the latter are of said one phase, electronic amplifying means to amplify each of said transient oscillatory currents, a pair of electronic valves each having an input circuit and an output circuit, means to impress said first mentioned oscillatory currents to the input circuits of said valves in parallel, means to impress said additional oscillatory currents to the output circuits of said valves in opposite phase relation, and means responsive to the difference between the magnitudes of the average current flows in the output circuits of said valves to control the magnitude of said reference electromotive force to reduce said resultant electromotive force.

13. The combination of claim 12 wherein said translating means includes a circuit on which the resultant of said electromotive forces is applied and having connected in series therein, a switch and an impedance comprised of capacitive, resistive and inductive components for producing said first mentioned oscillatory current, a separate circuit having connected in series therein a source of unidirectional potential, said switch, and an impedance comprised of capacitive, resistive and inductive components for producing said additional oscillatory current, and means to periodically open and close said switch, the capacitive, resistive and inductive components of each impedance being so related that the resistive component squared is less than four times the ratio of the inductive component to the capacitive component.

14. The combination of claim 12 wherein said translating means includes a circuit on which the resultant of said electromotive forces is applied and having connected therein an impedance comprised of capacitive, resistive and inductive components for producing said first mentioned oscillatory current, a separate circuit on which a source of unidirectional potential is applied and having connected in series therein an impedance comprised of capacitive, resistive and inductive components for producing said additional oscillatory current, a connection between said circuits connecting said impedances in series, a switch in said connection, and means to periodically open and close said switch, the capacitive, resistive and inductive components of each impedance being so related that the resistive component squared is less than four times the ratio of the inductive component to the capacitive component.

15. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a reference electromotive force, means for translating the resultant of said electromotive forces into a succession of waves of transient high frequency oscillatory currents of one phase of opposite phase depending upon the polarity of said resultant electromotive force and for simultaneously producing two additional successions of waves of rapidly vanishing oscillatory currents, one of said additional oscillatory currents being in phase with said first mentioned oscillatory current when the latter is of one phase and the other of said additional oscillatory currents being in phase with the said first mentioned oscillatory current when the latter is of opposite phase, means to compare the phase of said first mentioned oscillatory current to the phase of said additional oscillatory currents and arranged to produce a unidirectional potential of one polarity or of opposite polarity depending upon the phase of said first mentioned oscillatory current, a source of alternating current of predetermined frequency, means to translate said unidirectional potential into a fluctuating current of the frequency of said alternating current source and of one phase or of opposite phase depending upon the polarity of said unidirectional potential, and means including an alternating current motor energized by said alternating current source and by said fluctuating current to effect a balance of said opposed electromotive forces.

16 A self balancing system for the measurement of an electromotive force too small to directly effect control of said system and whose fluctutaions in magntiude with time comprise components of frequencies difficult of direct amplification comprising an electrical system upon which said electromotive force is impressed, means for opposing to said electromotive force a variable reference electromotive force, means to vary said reference electromotive force including a two phase reversible electrical motor, a source of alternating current for energizing one of the phases of said motor, and means for energizing the other phase of said motor to control the actuation of the latter including means for translating the resultant of said electromotive forces into a succession of waves of rapidly vanishing high frequency oscillatory currents of one phase or of opposite phase depending upon the polarity of said resultant electromotive force and for simultaneously producing two additional successions of waves of rapidly vanishing oscillatory currents of the same frequency as said first mentioned oscillatory currents, one of said additional currents being in phase with said first mentioned oscillatory currents when the latter are of one phase and the other of said additional oscillatory currents being in phase with said first mentioned oscillatory currents when the latter are of the opposite phase, a pair of electronic valves each having an input circuit and an output circuit, means to apply said first mentioned oscillatory current to the input circuits of said valves, means to impress one of said additional oscillatory currents on the output circuit of one of said valves, means to impress the other of said oscillatory currents on the output circuit of the other of said valves, a resistance connected in the output circuits of each of said valves, a condenser connected across each of said resistances whereby a direct current potential is produced across each of said condensers in accordance with the phase and amplitude of said first mentioned transient oscillating current, a second pair of electronic valves each having an anode, a cathode and a control elcetrode, a transformer having a primary winding energized by said alternating current source and also having a center tapped secondary winding, a connection from one end of said secondary winding to the anode of one of said valves and a connection from the other end of said secondary winding to the anode of the other valve, a connection from both of said cathodes to the center tap on said secondary winding including said other phase of said. motor, means to impress the potential produced across one of said condensers between the control electrode and cathode of one of said valves, and means to impress the potential produced across the other of said condensers between the control electrode and cathode of the other of said valves.

17. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said electromotive force a variable reference electromotive force, means to vary said reference electromotive force including an alternating current motor having a pair of balanced operating circuits, a pair of electronic valves connected each in one of said circuits, each of said valves having an input circuit and an output circuit, circuit means for supplying alternating current to the output circuits of said electronic valves in opposite phase relation, and means to control the input circuits of said valves including means for translating the resultant of said electromotive forces into a succession of waves of rapidly vanishing high frequency oscillatory currents of one phase or of opposite phase depending upon the polarity of said resultant electromotive force and for simultaneously producing two additional successions of waves of rapidly vanishing oscillating currents of the same frequency as said first mentioned oscillatory currents, one of said additional currents being in phase with said first mentioned oscillatory currents when the latter are of one phase and the other of said additional oscillatory currents being in phase with said first mentioned oscillatory currents when the latter are of the opposite phase, electronic amplifying means to amplify the first mentioned of said oscillatory currents, a second pair of electronic valves each having an input circuit and an output circuit, means to simultaneously apply the amplified components of said first mentioned oscillatory currents to the input circuits of said valves, means to impress one of said additional currents on the output circuit of one of said second mentioned valves and to impress the other of said additional currents on the output circuit of the other of said second mentioned valves, a resistance connected in the output circuits of each of said valves, a condenser connected across each of said resistances whereby a unidirectional potential is produced across each of said condensers in accordance with the phase and amplitude of said first mentioned oscillatory currents, a connection to impress the potential produced across one of said condensers to the input circuit of one of said first mentioned valves, and a connection to impress the potential produced across the other of said condensers to the input circuit of the other of said first mentioned valves.

18. In a measuring instrument, a circuit including a direct current electrical quantity to be measured, means for translating said direct current electrical quantity into a transient oscillating current of one phase or of opposite phase depending upon the polarity of said direct current electrical quantity, means including electronic amplifying means to amplify said transient oscillating current and to produce a unidirectional potential of polarity and magnitude corresponding to the phase and the amplitude of said transient oscillating current, and means to measure the magnitude of said unidirectional potential.

19. In a measuring instrument, a circuit including a direct current electrical quantity to be measured, means for translating said direct current electrical quantity into a transient oscillating current of one phase or of opposite phase depending upon the polarity of said direct current electrical quantity which may be readily amplified comprising a circuit including a switch, said direct current electrical quantity, and capacitive, resistive and inductive components connected in series, said switch being operative to periodically open and close said circuit, electronic amplifying means to amplify said transient oscillating current and to produce a direct current potential of polarity and magnitude corresponding to the phase and the amplitude of said transient oscillating current, and means to measure the magnitude of said direct current potential.

20. A self balancing system for the measurement of an electromotive force too small to directly effect control of said system and whose fluctuations in magnitude with time comprise components of frequencies difficult of direct amplification comprising an electrical circuit upon which said electromotive force is impressed, means for opposing to said electromotive force a reference electromotive force, circuit means for translating the resultant of said electromotive forces into a transient oscillating current of one phase or of opposite phase depending upon the polarity of said resultant electromotive force, means through which the resultant of said electromotive forces is applied to said circuit means to exclude extraneous fluctuating electromotive forces from said circuit means, an amplifier associated with said circuit means to amplify said transient oscillating currents, and means responsive to the phase of said oscillatory currents to effect balance of said electromotive forces.

21. The combination of claim 20 wherein the said means through which the resultant of said electromotive forces is applied to said circuit means includes a filter.

22. The combination of claim 20 wherein the said means through which the resultant of said electromotive forces is applied to said circuit means includes a filter and an electronic amplifier arranged to detect the presence of extraneous fluctuating electromotive forces appearing at the output of said filter and to impress a fluctuating electromotive force of opposite phase on the input of said filter whereby the effects of the extraneous fluctuating electromotive forces passing through the filter are cancelled out.

23. In a measuring instrument, a circuit including a unidirectional electromotive force to be measured, means for translating said unidirectional electromotive force into an oscillating electromotive force of one phase or of opposite phase depending upon the polarity of said unidirectional electromotive force and which may be readily amplified, means through which said unidirectional electromotive force is applied to said translating means including a filter and an electronic amplifier arranged to detect the presence of extraneous fluctuating electromotive forces appearing at the output of said filter and to impress a fluctuating electromotive force of opposite phase on the input of said filter to neutralize the effects of extraneous fluctuating electromotive forces passing through said filter, electronic amplifying means to amplify said oscillating electromotive force and to produce a unidirectional potential of polarity and magnitude corresponding to the phase and the amplitude of said oscillating electromotive force, and means to measure the magnitude of said unidirectional potential.

24. A self balancing system for the measurement of an electromotive force too small to directly effect control of said system and whose fluctuations in magnitude with time comprise components of frequencies difficult of direct amplification comprising an electrical system upon which said electromotive force is impressed, means for opposing to said first mentioned electromotive force a reference electromotive force, means for translating the resultant of said electromotive forces into a succession of waves of transient oscillatory currents, an air core transformer having a primary winding on which said transient oscillatory currents are impressed and having a secondary winding inductively associated with said primary winding, an amplifier having an input circuit connected to the secondary winding of said air core transformer and having an output circuit, and means controlled by the currents in the output circuit of said amplifier to effect a balance of said electromotive forces.

25. The combination of claim 24 in which the secondary winding of said air core transformer is tuned to the frequency of said transient oscillatory currents.

26. In a measuring instrument, a circuit including a unidirectional electromotive force to be measured, means for translating said unidirectional electromotive force into an oscillating electromotive force of phase and amplitude depending upon the polarity and amplitude of said unidirectional electromotive force, means through which said unidirectional electromotive force is applied to said translating means including a filter and an electronic amplifier arranged to detect the presence of extraneous fluctuating electromotive forces appearing at the output of said filter and to impress a fluctuating electromotive force of opposite phase on the input of said filter to neutralize the effecs of extraneous fluctuating electromotive forces passing through said filter, said translating means including an air core transformer having a primary winding in which said oscillating electromotive force is produced and having a secondary winding inductively associated with primary winding, electronic amplifying means having an input circuit connected to the secondary winding of said air core transformer to produce a unidirectional potential of polarity and magnitude corresponding to the phase and the amplitude of said oscillating electromotive force, and means to measure the magnitude of said unidirectional potential.

27. Apparatus for measuring an unknown electromotive force of minute magnitude and operative to eliminate the effects of extraneous fluctuating electromotive forces which are superimposed upon said electromotive force comprising an electrical system upon which said electromotive force is impressed, means for opposing to said first mentioned electromotive force a reference electromotive force, means to filter the resultant of said electromotive forces, means to detect extraneous electromotive forces present in the filtered resultant electromotive force and to apply a fluctuating electromotive force on the unfiltered resultant electromotive force in opposition to the extraneous electromotive forces to render said filtered resultant electromotive force substantially free from said extraneous electromotive forces, and means to apply the filtered resultant electromotive force to effect a balance between said known and unknown electromotive forces.

28. The combination of claim 27 wherein said last mentioned means includes means to translate said filtered resultant electromotive force into a fluctuating electromotive force, an air core transformer having a primary winding on which said fluctuating electromotive force is impressed and having a secondary winding inductively associated with said primary winding, an electronic amplifying means having an input circuit connected to the secondary winding of said transformer and having an output circuit, and means connected to the output circuit of said electronic amplifying means to effect a balance between said known and unknown electromotive forces.

HARRY S. JONES.